United States Patent
Nunnink et al.

(10) Patent No.: US 11,327,387 B2
(45) Date of Patent: May 10, 2022

(54) OPTICAL ILLUMINATION FOR STATUS INDICATION

(71) Applicant: Cognex Corporation, Natick, MA (US)

(72) Inventors: Laurens Nunnink, Simpelveld (NL); Francisco Javier Azcona Guerrero, Aachen (DE); Richard Reuter, Wurselen (DE); Andreas Weber, Aachen (DE); Ben Carey, Boston, MA (US)

(73) Assignee: COGNEX CORPORATION, Natick, MA (US)

( * ) Notice: Subject to any disclaimer, the term of this patent is extended or adjusted under 35 U.S.C. 154(b) by 0 days.

(21) Appl. No.: 17/222,747

(22) Filed: Apr. 5, 2021

(65) Prior Publication Data

US 2021/0397071 A1    Dec. 23, 2021

Related U.S. Application Data

(63) Continuation of application No. 16/252,170, filed on Jan. 18, 2019, now Pat. No. 10,969,661.

(51) Int. Cl.
*G03B 17/18* (2021.01)
*G03B 15/05* (2021.01)

(52) U.S. Cl.
CPC ............ *G03B 17/18* (2013.01); *G03B 15/05* (2013.01); *G03B 2215/0503* (2013.01); *G03B 2215/0567* (2013.01); *G03B 2215/0571* (2013.01)

(58) Field of Classification Search
CPC ................... G03B 17/18; G03B 2215/0571

USPC ................................................... 235/462.42
See application file for complete search history.

(56) References Cited

U.S. PATENT DOCUMENTS

| | | |
|---|---|---|
| 5,856,660 A | 1/1999 | Bard et al. |
| 6,808,114 B1 | 10/2004 | Palestini et al. |
| 7,387,246 B2 | 6/2008 | Palestini et al. |
| 7,527,207 B2 | 5/2009 | Acosta et al. |
| 8,752,768 B2 | 6/2014 | Gao |
| 8,800,874 B2 | 8/2014 | Gao |
| 8,998,092 B2 | 4/2015 | Gao |
| 9,646,189 B2 | 5/2017 | Lu et al. |
| 9,697,400 B2 | 7/2017 | Utykanski et al. |
| 10,095,900 B2 | 10/2018 | Powell et al. |
| 2003/0001018 A1 | 1/2003 | Hussey et al. |
| 2007/0082652 A1 | 4/2007 | Hartigan et al. |
| 2012/0181338 A1* | 7/2012 | Gao ................. G06K 7/12 235/455 |

* cited by examiner

*Primary Examiner* — Toan C Ly
(74) *Attorney, Agent, or Firm* — Quarles & Brady LLP

(57) ABSTRACT

An illumination system is provided for an optical system that includes an imaging device for acquiring an image of a target, for decoding of a symbol or other analysis. The illumination system can include a first light source configured to provide illumination of a first wavelength, a second light source configured to provide illumination of a second wavelength that is different from the first wavelength. The light sources can be controlled for operations that include: illuminating the target with the first and second light sources simultaneously for acquisition of the image of the target; and altering an illumination output of at least one of the first light source or the second light source, while maintaining non-zero illumination output for at least one of the first light source or the second light source, to indicate a status of the optical system.

20 Claims, 5 Drawing Sheets

OPTICAL ILLUMINATION FOR STATUS INDICATION

CROSS-REFERENCE TO RELATED APPLICATIONS

This application claims priority, as a continuation application, to U.S. patent application Ser. No. 16/252,170 filed on Jan. 18, 2019 and titled "Optical Illumination for Status Indication," the entirety of which is incorporated herein by reference.

BACKGROUND

In many applications it may be useful to illuminate targets for image acquisition, such as optical codes that are to be decoded. It may also be useful to provide an indication regarding the status of an image acquisition or other system, such as to provide information regarding success in decoding attempts. In some contexts, for example, status indicators can communicate whether an optical code was accurately decoded.

SUMMARY

Some embodiments of the technology provide an illumination system for an optical system that includes an imaging device that is configured to acquire an image of a target, for decoding of a symbol on the target or other analysis. The illumination system can have a plurality of light sources, including a first light source configured to provide illumination of a first wavelength and a second light source configured to provide illumination of a second wavelength that is different from the first wavelength. The illumination system can also have a controller device configured to control the plurality of light sources for operations that include: illuminating the target, using the first and second light sources simultaneously, for acquisition of the image of the target by the optical system; and altering an illumination output of at least one of the first light source or the second light source, while maintaining non-zero illumination output for at least one of the first light source or the second light source, to indicate a status of the optical system after the acquisition of the image.

Some embodiments of the technology provide an optical system for acquiring an image of a target to decode a symbol in the image or perform other analysis. The optical system can have an imaging device configured to acquire the image, and an illumination system. The illumination system can include a plurality of light sources, including a first light source configured to provide illumination of a first wavelength and a second light source configured to provide illumination of a second wavelength that is different from the first wavelength. The illumination provided by the second light source can substantially overlap with the illumination provided by the first light source. The illumination system can also include a controller device configured to control the plurality of light sources for operations that include: illuminating the target, using the first and second light sources simultaneously, for acquisition of the image of the target by the imaging device; and reducing an illumination output of the first light source, while maintaining non-zero illumination output for the second light source, to indicate a status of the optical system after the acquisition of the image.

Some embodiments of the technology provide a method for indicating a status for image acquisition or analysis, for use with an optical system that includes a controller device, an imaging device that is configured to acquire an image of a target for decoding of a symbol on the target or other analysis, and an illumination system. The illumination system can include a plurality of light sources including a first light source configured to provide illumination of a first wavelength and a second light source configured to provide illumination of a second wavelength that is different from the first wavelength. The method can include illuminating the target, using the first and second light sources simultaneously, for acquisition of an image of the target by the imaging device. Using the controller device, a first status of the optical system can be identified, related to at least one of acquisition or analysis of an image of the target. An illumination output of at least one of the first light source or the second light source can be altered, while non-zero illumination output for at least one of the first light source or the second light source is maintained, to indicate visually on the target the first status of the optical system.

BRIEF DESCRIPTION OF THE DRAWINGS

The accompanying drawings, which are incorporated in and form a part of this specification, illustrate embodiments of the technology and, together with the description, serve to explain the principles of embodiments of the technology.

DETAILED DESCRIPTION

Figure 1:
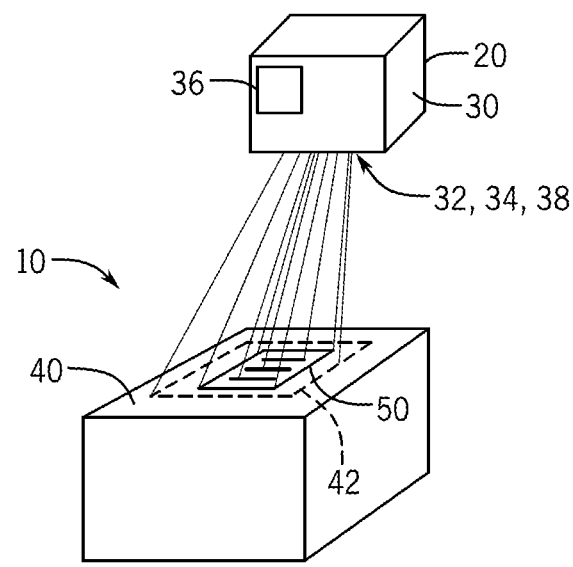
FIG. 1 is a perspective view of an optical system illuminating a target for image acquisition, according to an embodiment of the technology.

Before any embodiments of the technology are explained in detail, it is to be understood that the technology is not limited in its application to the details of construction and the arrangement of components set forth in the following description or illustrated in the following drawings. The technology is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof in structural contexts are used broadly and encompass both direct and indirect mountings, connections, supports, and couplings. Further, "connected" and "coupled" are not restricted to physical or mechanical connections or couplings.

Some embodiments of the technology can be implemented as systems and/or methods, including computer-implemented methods. Some embodiments of the technology can include (or utilize) a device such as an automation device, a special purpose or general purpose computer including various computer hardware, software, firmware, and so on, consistent with the discussion below.

In some implementations, aspects of the technology, including computerized implementations of methods according to the technology, can be implemented as a system, method, apparatus, or article of manufacture using standard programming and/or engineering techniques to produce software, firmware, hardware, or any combination thereof to control a computer or other processor device to implement aspects detailed herein. The term "article of manufacture" as used herein is intended to encompass a computer program accessible from any computer-readable device, carrier (e.g., non-transitory signals), or media (e.g., non-transitory media). For example, non-transitory computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick). Of course, those skilled in the art will recognize many modifications may be made to these configurations without departing from the scope or spirit of the claimed subject matter.

The following discussion is presented to enable a person skilled in the art to make and use embodiments of the technology. Various modifications to the illustrated embodiments will be readily apparent to those skilled in the art, and the generic principles herein can be applied to other embodiments and applications without departing from embodiments of the technology. Thus, embodiments of the technology are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the technology. Skilled artisans will recognize the examples provided herein have many useful alternatives that fall within the scope of embodiments of the technology.

Some of the discussion below describes illumination systems for optical systems that can illuminate and acquire an image of a target, including a symbol, such as a barcode, and can provide optical indicators of associated system statuses. The context and particulars of this discussion are presented as examples only. For example, embodiments of the disclosed technology can be arranged in various configurations, including with more, fewer, or different elements for illuminating a target than are expressly presented below. Similarly, although certain status indicators are specifically discussed below, embodiments of the technology can be used to provide any number of status indicators, including those relating to the status of decoding of images and others.

In conventional arrangements, status information for an optical system can be provided using illumination elements, such as light emitting diodes (LEDs), or other types of status indicators, that are arranged to be directly viewed (or otherwise directly engaged) by an operator. For example, some conventional status indicators include a dedicated status light that is arranged to be directly viewed by an operator to indicate a system status. For example, an LED on a handheld optical scanner can be positioned to face an operator (e.g., away from an imaging target) during use of the scanner. Such an LED can then be illuminated to directly provide visual status information to the operator. Another example of a conventional status indicator is an audible indication that provides status information through various sounds emitted from a device. A further example of a conventional status indicator is a form of tactile response such as a vibration.

Although conventional arrangements can provide useful indications of a system status, they can be limited in their effectiveness, including due to aspects of the environments in which they are employed. For example, some environments can be too noisy for operators to hear an auditory status indicator. Similarly, in some environments, an operator may not be positioned for easy direct viewing of a status indicator. For example, in presentation mode operations, an imaging device may be positioned remotely from an operator, so that the operator may be required to shift his or her attention away from a task at hand—e.g., to look upward—in order to view a status indicator that is displayed on the imaging device itself. Similarly, in some environments, a system may be remotely mounted such that any tactile feedback cannot be readily felt by an operator. Or lighting that is conducive to visual indication in a particular environment may vary from light that appropriately supports image acquisition or other operations. Conventional arrangements can also be limited with regard to the number of different statuses that they can communicate.

Embodiments of the technology can address these or other issues. For example, in some embodiments, a light source on an optical system can project a status of the optical system (e.g., after acquiring an image) directly onto a target, such as a scanning area for presentation mode operations. In this way, for example, operators can readily view status indicators without needing to look away from the target. In some embodiments, the use of overlapping light sources for image acquisition and status indication can allow for customizable and varied indication of multiple statuses.

In some embodiments, a light source for projecting status indicators can also be used for illumination of an object during image acquisition. For example, illumination output of multiple light source can be projected onto a target to acquire an image. After acquisition of the image, illumination from one or more of the light sources can be altered (e.g., dimmed, brightened, or turned off) to change the appearance of the projected light and thereby indicate, on the image-acquisition target, a status of the optical system.

As another example, some embodiments of the technology can illuminate a target using a first light source with a first wavelength and a second light source with a second wavelength. After acquisition of an image from the target, as enabled by the combined illumination from the first and second light sources, illumination from the first light source or the second light source can be altered (e.g., dimmed, brightened, or turned off) to change the visible appearance of illumination projected by the light source(s), and thereby indicate a status of the optical system. In some embodiments, different appearances of the projected illumination (e.g., separate projections of different or multiple colors), as provided by selective control of continued illumination by multiple light sources, can be used to selectively indicate different statuses of the relevant system.

FIG. 1 illustrates an example illumination system 30 to be used in an optical system 10 with an imaging device 20, according to an embodiment of the technology. The illumination system 30 is configured to illuminate a target 40 and the imaging device 20 is configured to acquire an image of the target 40, such as may be useful for decoding a symbol 50 within the acquired image or performing other analysis. In some embodiments, for example, other analysis can include assessment of image sharpness (i.e., image focus) or of alignment of the imaging device 20, identification of errors relating to the symbol 50 or other features, assessment of object dimensions, and so on In different embodiments, different configurations are possible, for example, the illumination system 30 may be integrated into the imaging device 20 as shown here. Or an illumination system can be installed separately from an imaging device (e.g., at a remote location). Similarly, in some configurations, a different orientation or other arrangement of an optical system can be employed. For example, in the illustrated embodiment, the optical system 10 is configured for presentation operations, in which an operator can move an object (e.g., a box with the target 40 on one face thereof) into alignment with the imaging device 20. In other configurations, for example, an optical system according to the technology can be configured for other types of operations, including portable operations (e.g., with the optical system as a handheld system).

Generally, illumination systems according to embodiments of the technology can include multiple light sources, which can be controlled at least partly independently from each other. For example, the illumination system 30 includes a plurality of light sources 32, 34 including a first light source and a second light source. Further, a controller device, such as an embedded processor device 36, can be configured to control the first and second light sources 32, 34 to provide controlled aspects (e.g., brightness levels) of illumination.

In some embodiments, it may be useful to provide light sources that are configured to illuminate a target with different colors of light (i.e., with light of different wavelengths), such as may help to increase the contrast between features of interest and background. In this regard, for example, the first light source 32 is configured to provide illumination of a first wavelength. The first wavelength can be any wavelength, including from ultraviolet (e.g., approximately 10 nm to 400 nm) through infrared (e.g., approximately 700 nm to 100 µm), and including wavelengths in the visible light spectrum (e.g., approximately 400 nm-700 nm). In some embodiments, a first light source can be configured to selectively provide illumination in different wavelengths. In some embodiments, a first light source can include an arrangement of a first number of light emitting diodes (LEDs), such as a plurality of infrared or multi-spectrum LEDs.

In the illustrated embodiment, the second light source 34 is configured to provide illumination of a second wavelength different from the first wavelength. Similarly to the first light source 32, the second light source 32 can be configured to provide illumination with any wavelength, including from ultraviolet (e.g., approximately 10 nm to 400 nm) through infrared (e.g., approximately 700 nm to 100 µm), and including wavelengths in the visible light spectrum (e.g., approximately 400 nm-700 nm). In some embodiments, a second light source can be configured to selectively provide illumination in different wavelengths. In some embodiments, a second light source can include an arrangement of a second number of LEDs, such as a plurality of visible specific- or multi-spectrum LEDs.

In some cases, it may be useful to combine visible illumination from one light source with non-visible illumination from another light source. For example, with the first wavelength of the first light source in the infrared (or ultraviolet) spectrum, it may be useful to provide the second wavelength of the second light source in any wavelength within the visible light spectrum. This may be useful, for example, in order to provide appropriate illumination for image acquisition while avoiding lighting that is overly intense or visibly intrusive for operators.

In some embodiments in which the first light source includes an arrangement of a first number of LEDs (or other lights) and the second light source includes an arrangement of a second number of LEDs (or other lights), the second number of LEDs can be different than the first number of LEDs. Further, in some embodiments, the second number of LEDs can be smaller than the first number of LEDs. In this regard, for example, it may be possible to provide more intense illumination in a particular spectrum, including, for example, a non-visible spectrum.

In some cases, a third (or other additional) light source can be provided. For example, in some embodiments, the illumination system 30 also includes a third light source 38 that can also be controlled by the processor device 36. Usefully, the third light source 38 can be configured to provide illumination of a third wavelength that is different from the first and second wavelengths, including wavelengths over ranges similar to the first and second light sources 32, 34 or otherwise.

Still referring to FIG. 1 in particular, the illumination system 30 is shown acquiring an image of the target 40 including the symbol 50. As shown here, the illumination system 30 is located above the target 40 for the target 40 presented to the imaging device 20 and the illumination system 30, although other configurations are possible.

During the acquisition of the image, the target 40 is simultaneously illuminated with the first light source 32 providing a first illumination pattern and the second light source 34 providing a second illumination pattern. The solid lines extending between the illumination system 30 and the target 40 in FIG. 1 illustrate the combined simultaneous illumination provided by the first and second wavelengths of the first and second light sources, respectively. In some embodiments, including as illustrated, first and second illumination patterns of first and second light sources substantially overlap in order to provide a unified illumination pattern (e.g., the illumination pattern 42).

In different embodiments, different types of illumination patterns and different combinations of wavelengths can be provided, as appropriate to support appropriate acquisition of images. For example, in some contexts, image acquisition may be most appropriately executed using primarily red, infrared, or other wavelengths of light. In the illustrated embodiment, the first and second lights sources 32, 34 (and, as appropriate, the third light source 38, or others) can be controlled to provide the unified illumination pattern 42. For example, infrared LEDs in the first light source 32 can be illuminated to provide a main component of illumination for image acquisition, while visible-light LEDs in the second and third light sources 34, 38 can be activated to provide a particular visible color for the unified illumination pattern 42. In other implementations, of course, other combinations of wavelengths can be used, to provide any variety of illumination of the target 40 during image acquisition.

Usefully, in some embodiments, the same light source(s) used for illumination of a target during image acquisition can remain illuminated thereafter in order to provide an indicator of a system status. For example, after the imaging device 20 acquires the image, the processor device 36 can identify a status of the optical system 10 related to the acquisition or analysis of the image. The status of the optical system 10 can include, for example, statuses relating to an in-focus aspect of the acquired image, an out-of-focus aspect of the image, a misalignment of the imaging device 20, a successful decoding of the symbol 50 within the image, an unsuccessful decoding of the symbol 50 within the image, an error message related to the symbol 50, a determination of dimensions (e.g., 3D dimensions of the target 40), or other aspects associated with the imaging and decoding of the symbol 50.

Once a relevant status has been identified, the processor device 36 can control the illumination system 30 to indicate the status of the optical system 10 via continued projection of light onto the target 40. For example, the processor device 36 can be configured to alter an illumination output of the first light source 32, the second light source 34, the third light source 38, or any combination of the first, second, or third light sources 32, 34, 38, while continuing to project non-zero illumination output for at least one of the light sources 32, 34, 38 onto the target 40. In this way, for example, a visual indicator of the identified system status can be projected onto the target 40 by a set (e.g., a subset) of the light sources 32, 34, 38 that are used to illuminate the target 40 for image acquisition.

Further, in some configurations, the profile of a unified illumination pattern for image acquisition can be maintained during use of an illumination pattern to indicate an identified status. For example, at least one of the respective individual illumination patterns of the light sources 32, 34, 38 can be preserved during the altering of illumination output for status indication, via control of the first, second, or third light sources 32, 34, 38. In this way, a status-indicator unified illumination pattern 42A (see FIG. 2) to indicate system status can be controlled to exhibit a substantially identical profile as (i.e., to substantially geometrically overlap with) the image-acquisition unified illumination pattern 42 (see FIG. 1).

In different implementations, altering one or more light sources to indicate a status may include a variety of different operations. As one example, altering the illumination output can include reducing the illumination output of (i.e., dimming) one or more light sources, increasing the illumination output of (i.e., brightening) one or more light sources, or turning-off one or more light sources. In this regard, for example, some particular light source can be dimmed or brightened by dimming or brightening one or more individual light elements included in the light source.

In some implementations, altering an illumination output can include changing an illumination color. For example, in some configurations, one or more light sources can include an arrangement of LEDs of various colors (e.g., red, blue, green, etc.) capable of illuminating the target 40 in visible light of various wavelengths. Accordingly, for example, through selective control of certain LEDs, a variety of light colors (e.g., white light, predominantly light of predominantly one color, and so on) and patterns can be projected onto a target to indicate one or more different system statuses.

Figure 2:
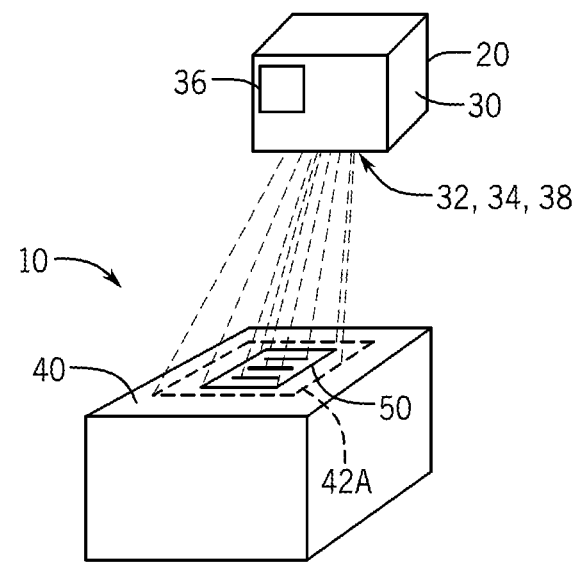
FIG. 2 is a perspective view of the optical system shown in FIG. 1 illuminating the target to indicate system status, according to an embodiment of the technology.

In this regard, in some implementations, the status for a successful decoding of an image can be indicated by turning off or otherwise reducing illumination from the first light source 32 (e.g., predominantly infrared light) while continuing to illuminate the target 40 with the second light source 34. As appropriate, for example, the second light source 34 can illuminate the target 40 with green light and can thereby provide a green afterglow on the illumination pattern 42A after a successful decoding of the image. This status indication is illustrated in FIG. 2 in which the dashed lines extending between the illumination system 30 and the target 40 represent an afterglow of green light provided only by the second light source. Other variations and combinations of alterations of the first and second (or other) light sources can be provided to indicate various statuses of the optical system 10.

In some embodiments, it may be useful to illuminate a target for different amounts of time to indicate a system status and to acquire an image. For example, for the illustrated embodiment, the target 40 can be illuminated for a shorter time for acquisition of an image than for providing an indication of a status (i.e., provide the altered illumination output). In some cases, the altered illumination output can illuminate the target 40 to indicate a system status for five times longer, or more, than the target 40 is illuminated for acquisition of an image.

As also discussed above, any number of different light sources can be used, in a variety of combinations, in order to illuminate a target for image acquisition and for indication of system statuses. For example, the target 40 can be illuminated using the light sources 32, 34, 38 simultaneously for acquisition of the image by the imaging device 20. Then, for example, the illumination output of at least one of the first or second light sources 32, 34 can be reduced, while non-zero illumination output is maintained for the third light source 38, to indicate a first status of the optical system. Similarly, for example, the illumination output of at least one of the first or third light sources 32, 38 can be altered, while non-zero illumination output is maintained for the second light source 34, to indicate a second status of the optical system 10 that is different from the first status.

Figure 3:
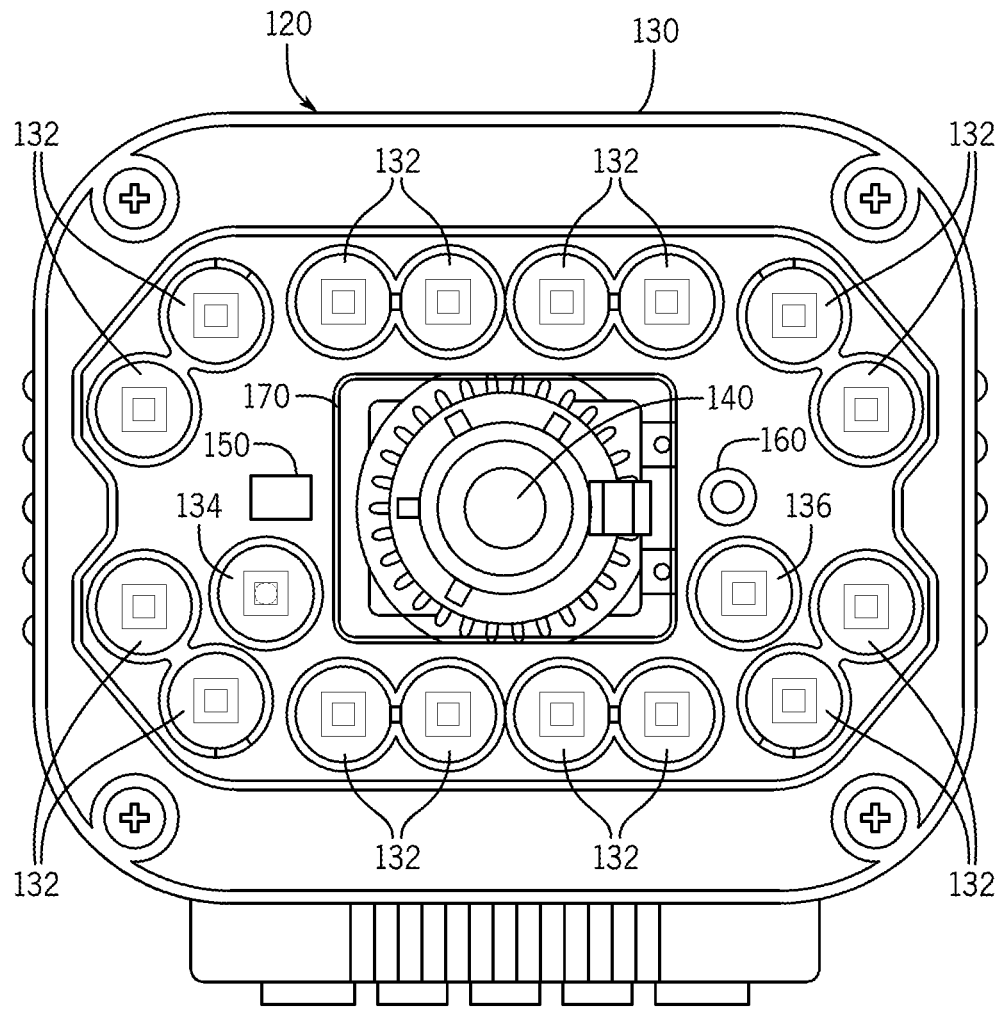
FIG. 3 is a front elevation view of an illumination system integrated with an imaging device, according to an embodiment of the technology.
Figure 4:
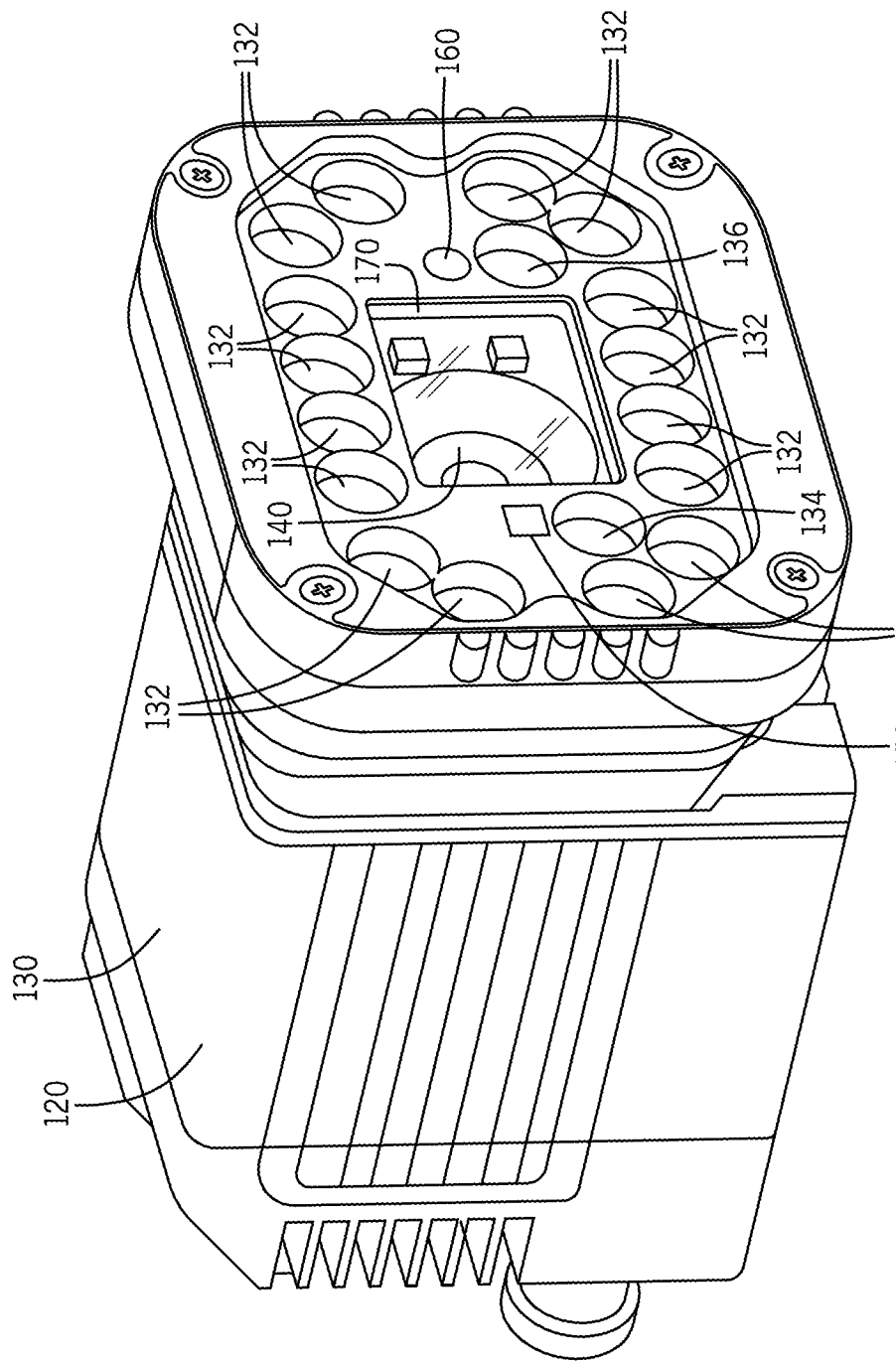
FIG. 4 is an isometric view of the imaging device shown in FIG. 3.

In some embodiments, an illumination system according to the technology can be integrated into an imaging device. Turning now to FIGS. 3 and 4, for example, an illumination system 130 according to an embodiment of the present technology is shown integrated into an imaging device 120. Generally, the illumination system 130 can be used to illuminate a target for image acquisition and indication of system status, including according to the principles discussed above. In this regard, for example, a first light source includes a plurality of LEDs 132. In different configurations, the plurality of LEDs 132 may provide illumination in various wavelengths including ultraviolet, infrared, and visible light, and, if the illumination is provided in the visible light spectrum, the plurality of LEDs 132 can contain LEDs of different colors (e.g., red, blue, green, etc.). For example, the plurality of LEDs 132 may include primarily red or white LEDs. In another example, the plurality of LEDs 132 may contain combinations of infrared, ultraviolet, and visible-light LEDs of various colors.

Similarly, a second light source includes a second LED 134, such as can provide one or more colors of visible light, such as green light or other colors. A third light source is also shown, including a third LED 136 that can provide one or more other colors of visible light, such as red or blue, or other colors. Similarly to light sources in other embodiments, the LEDs 132, 134, 136 can be controlled by an on-board controller (not shown), by a remotely located controller, or by a combination thereof.

In some embodiments, other combinations of lights can be included than are discussed above. For example, in some embodiments, the LEDs 134, 136 may both illuminate a target with the same visible wavelength of light. Similarly, in some embodiments, the LEDs 132, 134, 136 may all illuminate a target with primarily visible light, in different combinations (e.g., six LEDs for each of three different visible colors).

In different embodiments, other components can also be included. For example, the imaging device 120 also includes a camera 140, a sensor 150 for measuring the distance between a target and the camera 140, a laser projector 160 that can be configured to mark the center and edges of the field of view of the camera 140, and a lens 170 that extends over the camera 140.

In some embodiments other benefits can also be provided. For example, an acquisition phase for the camera 140 can be configured to run continuously until an image of a target is acquired, such as with a sampling rate of 30-60 frames a second, with illumination for acquisition and status indication controlled appropriately.

In some operations of the imaging device 120, the LEDs 132, 134, 136 can be controlled (e.g., by an on-board controller) in order to collectively illuminate a target (not shown) for acquisition of an image by the camera 140. In this regard, for example, illumination patterns from the LEDs 132, 134, 136 may substantially overlap, such that the predominance of the red or white LEDs 132 may result in a primarily red or white illumination pattern. Upon determination of a system status, such as may relate to a successful image acquisition, an out-of-focus image, a successful or unsuccessful decoding attempt, and so on, illumination by the LEDs 132, 134, 136 can then be altered so that an illumination pattern of a different appearance can provide a visual indicator of the system status on the imaging target. For example, to indicate a successful read, the LEDs 132, 136 may be dimmed or turned off, so that green light from the LED 134 is visually predominant on the target. Similarly, for an unsuccessful read, the LEDs 132, 134 may be dimmed or turned off, so that red or blue light from the LED 136 is visually predominant on the target. In this regard, for example, as also discussed above, it may also (or alternatively) be possible to intensify the illumination from select LEDs (e.g., the LEDs 134, 136) or otherwise control illumination to provide similar effect.

In some embodiments, other alteration of lighting to indicate a system status may also be possible. For example, illumination of certain light sources can be modulated so that an illumination patterns flickers or otherwise changes (e.g., changes colors) to indicate any number of statuses.

Figure 5:
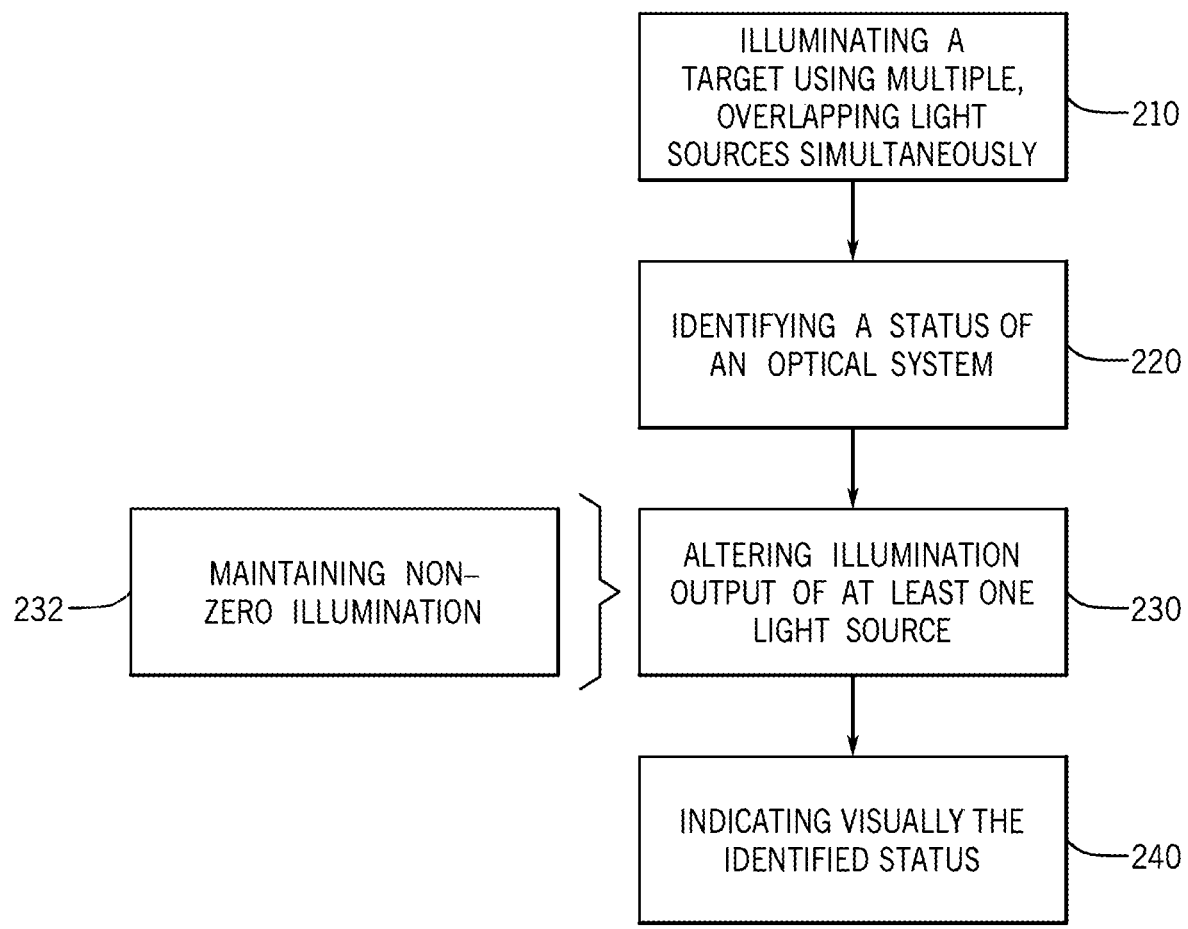
FIG. 5 is a schematic representation of a computer-implemented method for providing a status indicator, according to an embodiment of the technology.

In some embodiments, certain of the operations discussed above, or others, can be executed as a part of a computer-implemented method. For example, a method 200, as illustrated in FIG. 5, can be implemented by an embedded or other processing device (e.g., the device 36 of FIGS. 1 and 2) or other computing system, in order to control aspects of illumination for image acquisition and status indication for an imaging device (e.g., the device 20 of FIGS. 1 and 2). In this regard, for example, the method 200 can include illuminating 210 a target by simultaneous use of multiple, overlapping light sources, for acquisition of an image of a target. A first status of an optical system that includes the imaging device, related to at least one of the acquisition of the image or an analysis of the image, can then be identified 220. Based upon the nature of the identified 220 status, an illumination output of at least one of the light sources can then be altered 230, while non-zero illumination output is maintained 232 for at least one light source associated with the optical system, to indicate 240 visually on the target the identified 220 status of the optical system.

Figure 6:
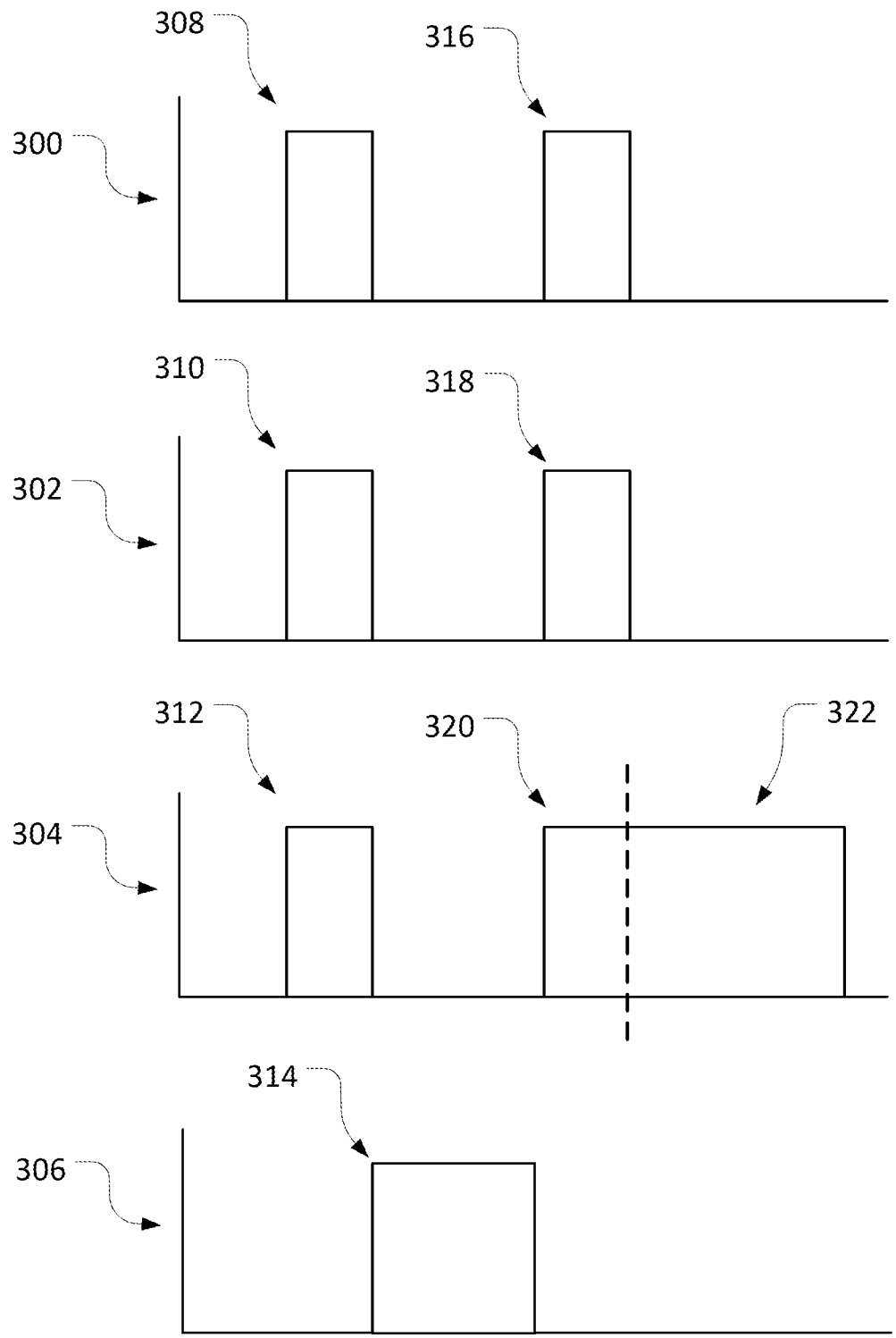
FIG. 6 is a schematic representation of the timing of operations of an illumination system, according to an embodiment of the technology.

Some discussion above refers to status information that is provided after an image is acquired. In some cases, status information may be provided immediately after an image is acquired. In some cases, status information may be provided only following a delay of some amount of time after an image is acquired. In some implementations, status information may relate directly to an image for which the immediately preceding (and subsequently altered) image-acquisition illumination is utilized. In some implementations, status information may relate to an image that precedes an image for which the immediately preceding (and subsequently altered) image-acquisition illumination is utilized. For example, FIG. 6 illustrates example simultaneous timing graphs 300, 302, 304, 306 for an image acquisition, a first light source, a second light source, and image processing, respectively, showing activation of the different relevant components over time. In the implementation illustrated, for example, a first image can be acquired 308, with the first and second light sources activated 310, 312. Image processing 314, such as for decoding of a symbol from the first image acquisition, can then proceed. Thereafter (or otherwise), a second image can be acquired 316, with the first and second light sources activated 318, 320. Based on the results of the image processing from the first image, the second light source can then be caused to remain illuminated 322, after the first light source is turned off (following the second image acquisition 316), to provide associated status information.

In other implementations, other configurations are possible. For example, certain features and combinations of features that are discussed above with respect to particular implementations can be utilized in other embodiments and in other combinations, as appropriate. In some implementations, operations in the methods disclosed herein, including the methods depicted in the FIGS., can be executed in different orders or simultaneously, including through operations executed by parallel processing devices.

Thus, embodiments of the technology can provide improved status identification for optical systems. In some embodiments, for example, providing a status by illuminating a target can substantially reduce the time and effort that may be required to know whether an acquired image was successfully decoded (or otherwise ascertain a relevant status), such as by obviating the need of an operator to look away from the target.

As similarly discussed above, certain operations disclosed herein can be implemented in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor device, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network. A depicted processor device, component, or module can be combined with any other processor device, component, or module or divided into various sub-processors, subcomponents, or submodules. Such can be variously combined according to embodiments herein.

Operations of methods disclosed herein steps can be performed by one or more programmable processor devices executing a computer program to perform functions of the technology by operating on input data and generating output. Operations of methods can also be performed by, and apparatuses can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processor devices suitable for the execution of a computer program include, by way of example, both general and special purpose microprocessors, and any one or more processors of any kind of digital computer. Generally, a processor device receives instructions and data from a read-only memory or a random access memory or both. The essential elements of a computer are a processor device for executing instructions and one or more memory devices for storing instructions and data. Generally, a computer also includes, or be operatively coupled to receive data from or transfer data to, or both, one or more mass storage devices for storing data, e.g., magnetic, magneto-optical, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor device and the memory can be supplemented by, or incorporated in, special purpose logic circuitry.

To provide for interaction with a user, the above described operations can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described operations can be implemented in a distributed computing system that includes a back-end component, e.g., as a data server, and/or a middleware component, e.g., an application server, and/or a frontend component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The previous description of the disclosed embodiments is provided to enable a person skilled in the art to make or use the technology. Various modifications to these embodiments will be readily apparent to those skilled in the art, and the generic principles defined herein may be applied to other embodiments without departing from the spirit or scope of the technology. Thus, the technology is not intended to be limited to the embodiments shown herein but is to be accorded the widest scope consistent with the principles and novel features disclosed herein and claimed below.

The invention claimed is:

1. An imaging device for acquiring images of a target, for decoding of a symbol on the target or other analysis, the imaging device comprising:
   a camera, including a lens; and
   an illumination system connected to the camera, the illumination system including:
      a plurality of light sources, including a first light source configured to provide illumination of a first wavelength and a second light source configured to provide illumination of a second wavelength that is different from the first wavelength; and
   a controller device configured to control the plurality of light sources to execute operations that include:
      illuminating the target, using the first and second light sources simultaneously, for acquisition of an image of the target by the camera; and
      reducing an illumination output of at least one of the first light source or the second light source, while maintaining non-zero illumination output for at least one of the first light source or the second light source, wherein reducing the illumination output of at least one of the first light source or the second light source provides an indication of a status of the camera after the acquisition of the image.

2. The imaging device of claim 1, wherein the illumination system is integrated into the camera.

3. The imaging device of claim 1, wherein reducing the illumination output of at least the first light source or the second light source includes turning off at least the first light source.

4. The imaging device of claim 1, wherein reducing the illumination output of at least the first light source or the second light source, while maintaining non-zero illumination output for at least one of the first light source or the second light source, provides a change in an illumination color projected by the plurality of light sources onto the target; and
   wherein the change in the illumination color indicates the status of the camera.

5. The imaging device of claim 1, wherein the status indicated by reducing the illumination output of at least the first light source, while maintaining non-zero illumination output for at least one of the first light source or the second light source, is a successful decoding of the symbol.

6. The imaging device of claim 1, wherein the status indicated by reducing the illumination output of at least the first light source, while maintaining non-zero illumination output for at least one of the first light source or the second light source, is configured to selectively relate to any one of: an in-focus or out-of-focus aspect of the image, a successful or unsuccessful image acquisition, a successful or unsuccessful decoding attempt.

7. The imaging device of claim 1, wherein the target is illuminated with the first and second light sources for acquisition of the image for a shorter time than the reduced illumination output is maintained to indicate the status.

8. The imaging device of claim 1, wherein the first light source includes an arrangement of a first number of infrared light emitting diodes (LEDs); and
   wherein the second light source includes an arrangement of a second number of visible-light LEDs.

9. The imaging device of claim 1, wherein the indication of the status of the camera corresponds to the image.

10. The imaging device of claim 9, wherein the controller device is further configured to control the camera to execute operations that include acquiring a preceding image prior to acquiring the image; and
  wherein the indication of the status of the camera corresponds to the preceding image.

11. The imaging device of claim 10, wherein the controller device is further configured to control the plurality of light sources to execute operations that include:
  illuminating the target, using the first and second light sources simultaneously, for acquisition of the preceding image of the target by the camera; and
  deactivating the first and second light sources between acquiring the preceding image and acquiring the image.

12. The imaging device of claim 1, wherein illuminating the target using the first and second light sources includes projecting a first illumination pattern with the first light source and a second illumination pattern with the second light source; and
  wherein the first and second illumination patterns substantially overlap so that a combined illumination pattern is shown in primarily a single color.

13. The imaging device of claim 12, wherein a shape of the combined illumination pattern is preserved during the reducing of the illumination output.

14. An optical system for acquiring images of a target to decode symbols in the images or perform other analysis, the optical system comprising:
  an imaging device configured to acquire the image; and
  an illumination system that is integrated into the imaging device and includes a plurality of light sources, including a first light source configured to provide illumination of a first wavelength and a second light source configured to provide illumination of a second wavelength that is different from the first wavelength, the illumination provided by the second light source substantially overlapping with the illumination provided by the first light source; and
  a controller device configured to control the plurality of light sources and the imaging device to execute operations that include:
    acquiring a first image of the target with the imaging device while illuminating the target with the first and second light sources simultaneously; and
    reducing an illumination output of the first light source, while maintaining non-zero illumination output for the second light source, wherein reducing the illumination output of at least one of the first light source or the second light source indicates a first status of the optical system associated with the acquisition of the first image.

15. The optical system of claim 14, further comprising:
  an integrated sensor configured to measure a distance between the target and the imaging device.

16. The optical system of claim 15, further comprising:
  an integrated laser projector configured to mark a field of view of the imaging device.

17. The optical system of claim 14, wherein reducing the illumination output of the first light source, while maintaining non-zero illumination output for the second light source, provides a change in an illumination color projected by the illumination system onto the target to indicate the first status of the optical system; and
  wherein the illumination system is configured to selectively provide different changes in the illumination color projected by the illumination system onto the target to indicate different statuses of the optical system.

18. The optical system of claim 14, wherein the controller device is further configured to control the plurality of light sources and the imaging device to execute operations that include:
  analyzing the first image; and
  causing the imaging device to acquire a second image of the target with the first and second light source activated;
  wherein the first status depends on a result of the analyzing of the first image; and
  wherein controller device is configured to reduce the illumination output of the first light source, while maintaining the non-zero illumination output for the second light source to indicate the first status after causing the imaging device to acquire the second image.

19. The optical system of claim 18, wherein the analyzing of the first image includes attempting to decode a symbol in the first image; and
  wherein the reducing of the illumination output of the first light source, while maintaining the non-zero illumination output for the second light source, indicates a result of the attempt to decode the symbol.

20. A method for indicating a status for image acquisition or analysis, for use with an optical system that includes a controller device, an imaging device that is configured to acquire images of a target for decoding of a symbol on the target or other analysis, and an illumination system that includes a plurality of light sources, including a first light source configured to provide illumination of a first wavelength and a second light source configured to provide illumination of a second wavelength that is different from the first wavelength, the method comprising:
  illuminating the target, using the first and second light sources simultaneously, for acquisition of an image of the target by the imaging device;
  attempting to decode one or more symbols in the image;
  identifying, using the controller device, a first status of the optical system that results from the attempt to decode the one or more symbols; and
  reducing an illumination output of at least one of the first light source or the second light source, while maintaining non-zero illumination output for at least one of the first light source or the second light source, wherein reducing the illumination output of at least one of the first light source or the second light source indicates a first status of the optical system.

* * * * *